(12) United States Patent
Tiedmann et al.

(10) Patent No.: US 8,936,197 B2
(45) Date of Patent: Jan. 20, 2015

(54) INTEGRAL TRACKING TAG FOR CONSUMER GOODS

(75) Inventors: Heiko Tiedmann, Dachau (DE); Dirk Poggemeier, Herford (DE); Kai Hauck, Wetter (DE)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 12/619,707

(22) Filed: Nov. 17, 2009

(65) Prior Publication Data

US 2011/0114734 A1 May 19, 2011

(51) Int. Cl.
G06K 19/00 (2006.01)
G06K 19/02 (2006.01)
G06K 19/077 (2006.01)
G06K 19/04 (2006.01)

(52) U.S. Cl.
CPC .......... *G06K 19/07749* (2013.01); *G06K 19/02* (2013.01); *G06K 19/041* (2013.01); *G06K 19/07758* (2013.01); *G06K 19/027* (2013.01)
USPC .......................................... 235/492; 235/487

(58) Field of Classification Search
USPC ............... 235/487, 492; 340/10, 572
See application file for complete search history.

(56) References Cited

U.S. PATENT DOCUMENTS

| | | | |
|---|---|---|---|
| 5,508,684 A * | 4/1996 | Becker | 340/572.5 |
| 5,583,489 A | 12/1996 | Loemker | |
| 5,624,514 A | 4/1997 | Frowein | |
| 6,827,817 B2 | 12/2004 | Bleckmann | |
| 7,170,415 B2 | 1/2007 | Forster | |
| 7,212,127 B2 * | 5/2007 | Jacober et al. | 340/572.8 |
| 7,247,214 B2 * | 7/2007 | Chamandy et al. | 156/249 |
| 7,543,402 B2 | 6/2009 | Halliday | |
| 7,724,144 B2 | 5/2010 | Bleckmann | |
| 2002/0066585 A1 | 6/2002 | Reid | |
| 2005/0253724 A1 * | 11/2005 | Krappe | 340/572.7 |
| 2007/0039687 A1 | 2/2007 | Hamilton | |
| 2008/0136588 A1 * | 6/2008 | Carter et al. | 340/5.61 |
| 2008/0223275 A1 * | 9/2008 | Kishi et al. | 112/102.5 |
| 2009/0079545 A1 | 3/2009 | Chow | |
| 2009/0100575 A1 * | 4/2009 | Darnborough | 2/244 |
| 2009/0206995 A1 | 8/2009 | Forster | |
| 2010/0059595 A1 * | 3/2010 | Longfu | 235/488 |
| 2010/0079286 A1 | 4/2010 | Phaneuf | |

* cited by examiner

*Primary Examiner* — Matthew Mikels
(74) *Attorney, Agent, or Firm* — Avery Dennison Corporation

(57) ABSTRACT

The present invention relates to an integral garment tag used for tracking and inventory control purposes. The tag includes a flexible fabric substrate which is wrapped around an RFID inlay to conceal the RFID inlay within the tag. The tag may then be attached to a garment or other consumer good along a single edge with instructions on the care and removal of the tag to satisfy privacy concerns. Removal of the tag will not interfere with the wearing of the garment.

16 Claims, 4 Drawing Sheets

INTEGRAL TRACKING TAG FOR CONSUMER GOODS

FIELD OF THE INVENTION

The present invention is in the field of tags used for inventory control and security of consumer goods. More particularly, the present invention relates to an integral tagging solution that is removably connected to an apparel item or other consumer good and which uses radio frequency as a mechanism for locating the item to which it is attached.

BACKGROUND OF THE INVENTION

The use of radio frequency identification (RFID) to identify one of a plurality of items is well known. Typical radio frequency identification (RFID) tags or integrated circuits include a microprocessor, also known as a microchip, electrically connected to an antenna. Alternatively, the microchip is first attached to a pad having electrical leads that provides a larger attachment of "landing" area. This is typically referred to as a "strap" or "interposer." The strap is then attached to the antenna.

The microprocessor stores data, which can include identifying data unique to a specific item, which is transmitted to an external receiver for reading by an operator and processing of the item. RFID tags can be attached to items for inventory control, shipment control, and the like. RFID tags are particularly useful in identifying, tracking and controlling items such as packages, pallets, and other product containers. The location of each item can be tracked and information identifying the owner of the item or specific handling requirements can be encoded into the RFID and later read by a scanning device capable of decoding and displaying the information.

Garment care and other labels is also well known and typically include care instructions, brand identification and other information such as source origin that are either required by certain regulations or are used in connection with the manufacturers marketing objectives. Such garments or other labels can be irritating to the skin due to the presence of stiff backers provided in the label. This can be particularly problematic where portions of the tag are removed leaving a stub or alternatively where a consumer attempts to remove the entire tag and potentially damages the garment.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The invention relates to an inventory and security tag for use with apparel items such as garments where it is desirable to include care and handling instruction as well as to provide some sort of tracking of the articles to better manage inventory. The tag of the present invention includes the option to preserve privacy by being able to selectively remove the tag from the garment or other consumer good. Removal of the tag will not create an irritating condition for the wearer of the garment.

In one exemplary embodiment an integral garment tag is described and includes a RFID device, the RFID device having an antenna and an integrated circuit connected to the antenna and first and second layers of a flexible material laminated together to cover the antenna and integrated circuit to form a RFID inlay having first and second surfaces and a first dimension. A flexible fabric substrate that has a second dimension at least one and half times greater than the first dimension. The fabric substrate has first and second surfaces, first and second longitudinally extending side edges and first and second transversely extending end edges. The first surface is provided with indicia.

Continuing with a description of the presently described embodiment, an adhesive layer is applied to one of the first and second surfaces of the RFID inlay. The RFID inlay is positioned on a portion of the second surface of the fabric substrate such that the adhesive layer is directly in contact with the fabric substrate to hold the RFID inlay securely to the second surface. The RFID inlay is positioned between the first and second longitudinally extending side edges and adjacent one of the first and second transversely extending end edges. The fabric substrate is folded over the RFID inlay such that the second surface of the fabric substrate is in contact with the first and second surfaces of the RFID inlay and the first and second longitudinally extending sides of the fabric substrate are secured together to form an envelope encasing the RFID inlay. The envelope with the RFID inlay has a head space which does not contain any portion of the RFID inlay. The envelope prevents the RFID inlay from being visible and only warning indicia may alert the user to the presence of the device.

In a further exemplary embodiment of the presently described invention, an intermediate construction for use with an integral garment tag is described and includes a RFID inlay that has first and second surfaces. A flexible fabric substrate has first and second sides and first and second sections, with each of the first and second sections having first and second portions, and each of the first and second portions have a dimension that is smaller than a dimension of each of the first and second sections. The flexible fabric substrate has a centerline that runs parallel to first and second sides.

Continuing with a description of the further exemplary embodiment, an adhesive layer is disposed on one of the first and second surfaces of the RFID inlay so as to substantially cover the one of the first and second surfaces and the adhesive is in contact with one of the first and second sections of the flexible fabric substrate and spaced inwardly of the first and second sides and the first and second edges of the substrate. Each of the first and second portions is removable from each of the first and second sections.

In a yet still further exemplary embodiment of the presently described invention, a method of making an integral garment tag is described and includes the steps of initially providing a fabric substrate, the fabric substrate having first and second ends and first and second sides and a centerline which defines first and second sections and a separation line which defines first and second portions. Next, a pattern of adhesive is placed on one of the first and second sections and a RFID inlay is positioned over the pattern of adhesive to adhesively secure the RFID inlay in place. Then, the fabric substrate is folded over the centerline to enclose the RFID inlay. The first and second sides and first and second ends are sealed to one another to form a tag and the tag is sewn to a garment.

The RFID inlay or device that is used in the presently described embodiment may be operated in the high frequency, low frequency or ultra high frequency ranges.

The fabric material may be of any suitable material including natural or synthetic fibers or recycled material such as a recycled polyester or PET.

Various indicia may be provided with the tag of the presently described invention. The indicia may be printed, imaged or sewn integrally with the fabric substrate itself and may include human and machine readable details. In addition, the indicia can include a border or other identifying region to aid in the positioning of the RFID device on the fabric substrate.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

Figure 1:
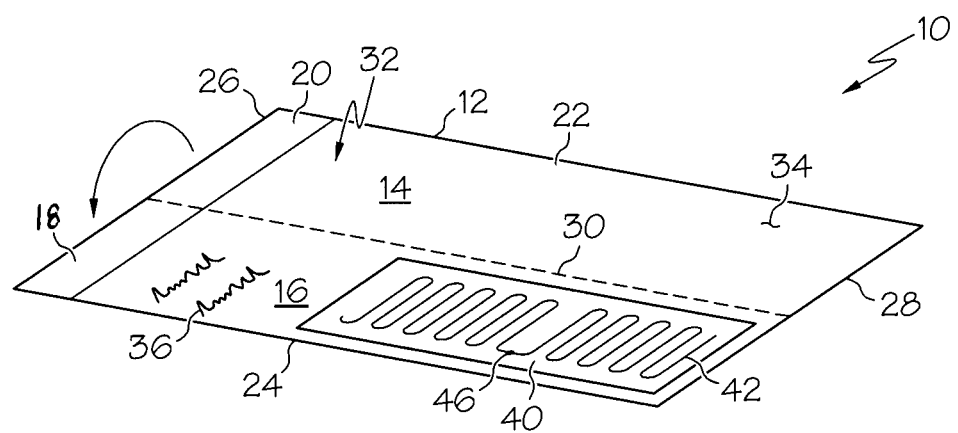
FIG. 1 depicts an intermediate of the garment tag in an unassembled arrangement.

Reference is now directed to FIG. 1, which shows an intermediate construction generally designated by reference numeral 10. The intermediate construction 10 is constructed from a flexible fabric substrate 12. The substrate material may be natural (e.g. cotton, wool, etc.) or synthetic fabrics (e.g. polyester, rayon, nylon, etc.) or may be made from recycled materials such as a recycled polyester or recycled PET. The fabric may be coated or treated to better withstand washing conditions or may be treated with other materials such as flame retardant chemicals.

The substrate has first and second sections 14, 16 and first and second portions 18 and 20. The substrate has first and second longitudinally extending sides 22 and 24 and first and second transversely extending end edges 26 and 28. The substrate is shown with a centerline 30 which runs parallel to the first and second sides 22 and 24 and a separation line 32 which is perpendicular to the centerline 30 and parallel to the first and second edges 26 and 28. As seen from FIG. 1, the separation line 32 is substantially closer to the first edge 26 than the second edge 28 and as such the first and second portions 18 and 20 have a significantly smaller dimension that each of the first and second sections 14 and 16. The portions 18 and 20 may range from 5% to 30% of the dimensions of the sections 14 and 16. The substrate 12 has first and second sides 34 and 36 (see FIG. 2). Indicia 36 is also provided on one or both of the sections 14 and/or 16 as may be needed. By only adhering the inlay on a single side to the flexible substrate the garment tag can have increase flexibility allowing the unsecured section to move or slide freely over the inlay.

A RFID inlay 40 is positioned on one of the sections 16 and includes an antenna portion and an integrated circuit 46 which may be a chip or a strap. Suitable inlays for use with the present invention are available from Avery Dennison RFID Company, Flowery Branch, Ga. The inlays will typically be encased in plastic or other flexible material and will enable the inlay to flex or bend along with the garment or tag in which it is enclosed in an envelope.

Figure 2:
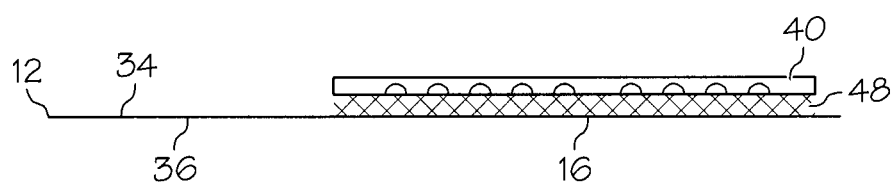
FIG. 2 provides a cross sectional view of the garment tag.

Turning now to FIG. 2 the substrate 12, with first surface 36 and second surface 34, is shown with a pattern of adhesive 48 applied so that the RFID inlay 40 can be adhesively secured to section 16 of the substrate 12. The adhesive is selected so that it can withstand washing or cleaning of the garment or consumer goods to which it is attached. One such suitable adhesive is FT 2922 available from Specialty Tape Division of Avery Dennison Corporation of Painesville, Ohio. Alternatively, instead of applying or coating a pattern of adhesive on the substrate, the adhesive can be provided as part of a transfer tape configuration and is applied to the RFID inlay 40 and then the inlay is adhered to the surface of the substrate. The adhesive may be clear (e.g. transparent translucent) or may be tinted or pigmented to assist in further concealing the RFID inlay or in connection with a particular trade dress of the manufacturer or retailer.

In addition, an adhesive or the coating applied to the fabric can be selected with conductive particles or materials so as to enhance or degrade the particular read range associated with the RFID device depending on the requirements of the manufacturer or retailer or even portions of the tag may be selectively removed. See for example U.S. Pat. Nos. 7,170,415, 7,212,127 and US 20090206995 all of which are commonly assigned with the present invention, and are hereby incorporated by reference herein as is necessary for a complete understanding of the present invention.

Figure 3:
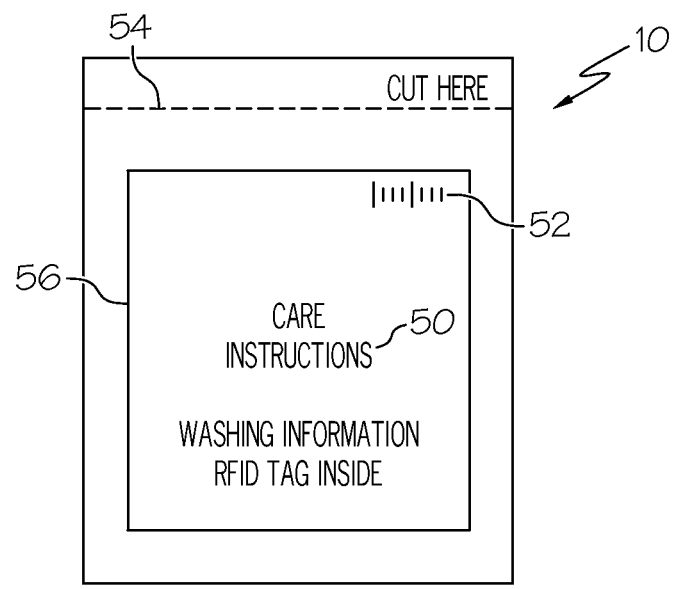
FIG. 3 shows a front elevational view garment tag.

FIG. 3 shows a finished garment tag 10. Human readable indicia 50 may include care instructions, warning information, for example to alert the consumer that the tag contains an RFID device or such other information as may be necessary. In addition, machine readable indicia 52 (such as machine vision readable) may also be included on the garment tag 10. As shown, a privacy protection feature is provided at 54 which could be a cut or a tear line. In this manner, the tag can be cut away such as with scissors or knife or alternatively may be torn if the tag is perforated such as with microperforations or larger cuts and ties. Preferably, the indicia is contained within a boundary line 56 which also outlines the area where the RFID device (not shown in FIG. 3) may be provided so that the consumer when removing the tag will be able to separate the tag cleanly from the garment.

By completely removing the tag, the consumer can still use the RFID device provided with the tag to for example return the garment to the place of purchase and the retailer can verify the garment. Alternatively, the RFID device could be used as part of a further marketing or accessorizing device, where the device could be read by a reader at a retail location to allow the consumer to find related apparel or other accessories that match the particular garment such as through an automated or online wardrobing system.

Figure 4:
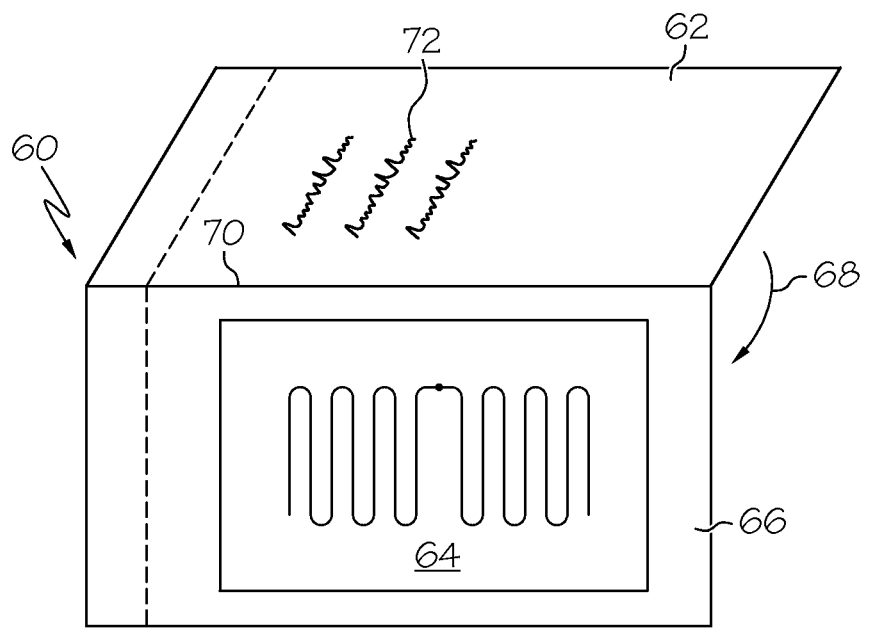
FIG. 4 illustrates another intermediate configuration for the garment tag.

FIG. 4 provides another view of an intermediate construction 60 which illustrates the folding over of one of the sections 62 to cover the RFID inlay 64 and section 66 as shown by arrow 68 about centerline 70. Indicia 72 has been printed on section 62 but it should be understood that the indicia can be printed or provided on either section 62 or 66. The indicia 72 will generally be visible on both sides of the substrate, with the exterior side or the side that the consumer will see the indicia will be readable whereas on the internal face, the face that will be against the RFID inlay the indicia would appear in a mirror image format. In addition, where indicia is only provided on one section, see through of the indicia from the other section will be prevented as it will be blocked out by the RFID inlay.

Figure 5:
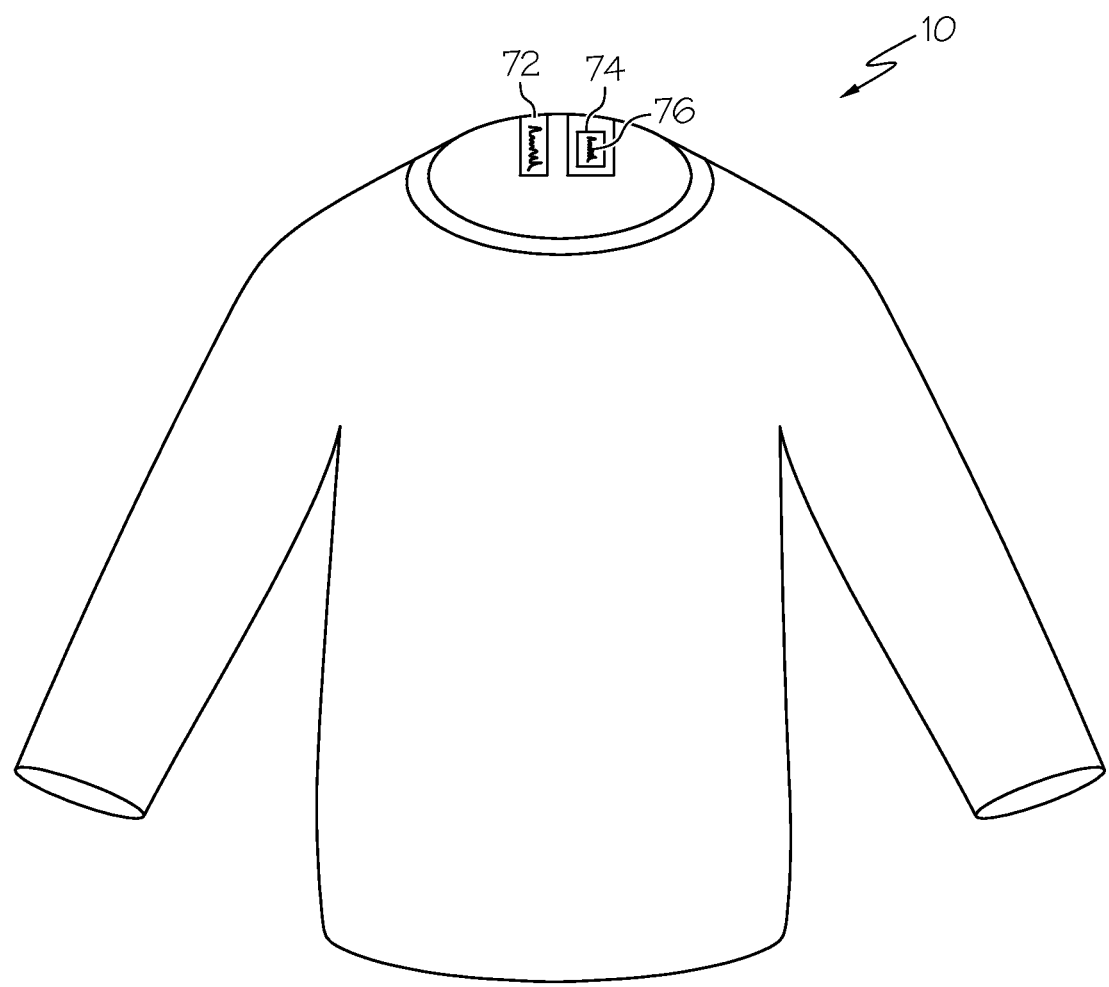
FIG. 5 depicts the garment tag attached to a garment.

FIG. 5 provides an exemplary use of the garment tag of the present invention and shows a garment 70 having a plurality of tags 72 and 74 attached thereto. Tag 74 shows the border 76 where the RFID device is contained so that the consumer is clearly aware of the presence of the device and can take steps to protect his or her privacy by removing the RFID garment tag after the garment 70 has been purchased. While the tag is illustrated as connected to the neck of the garment, it should be understood that the tag may be attached at any location a manufacturer or retailer decides. For example, the tag could be sewn internally of the garment such as at a side seam, hem etc.

Figure 6:
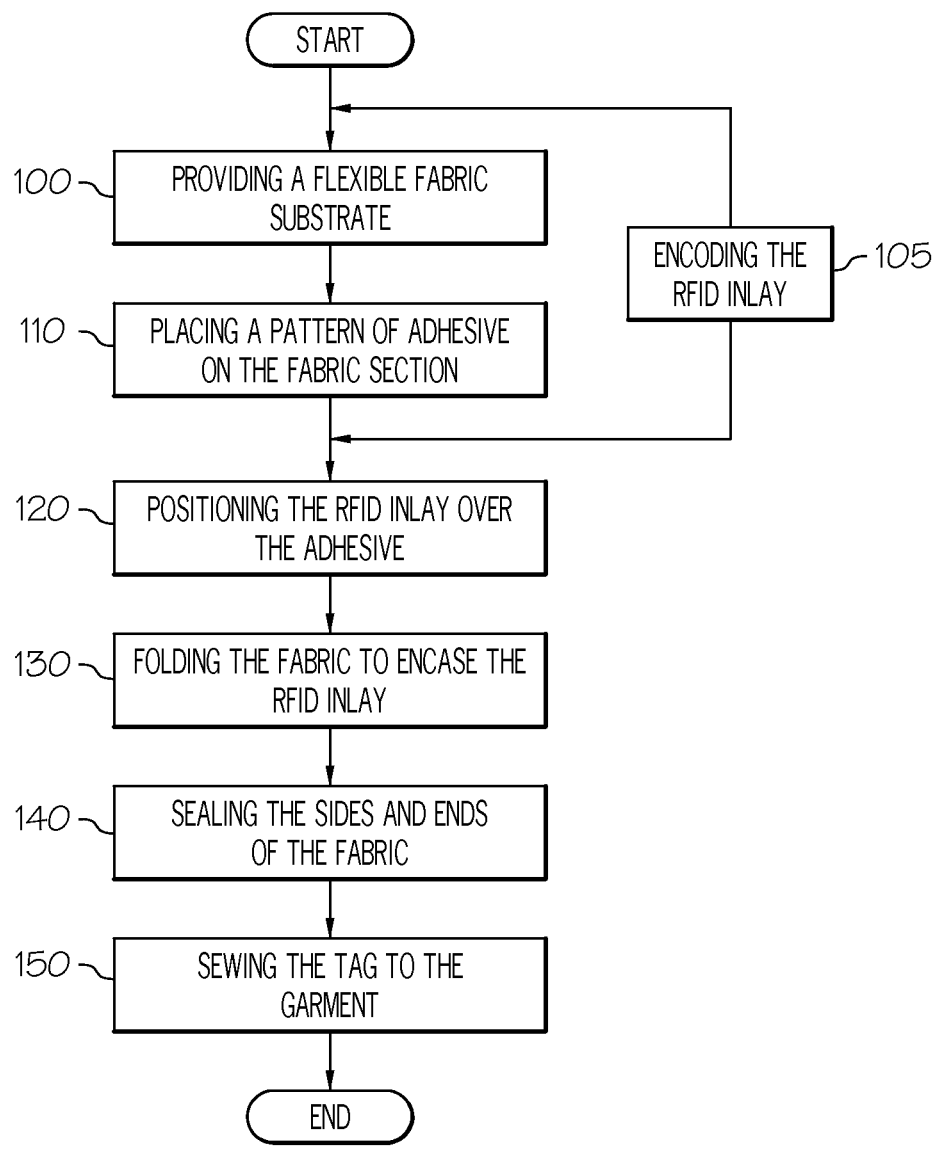
FIG. 6 shows a block diagram of an exemplary method for making a integral garment tag.

Turning now to FIG. 6 an exemplary method for producing a garment tag is provided in includes the steps of initially providing a flexible fabric substrate at step 100. Then at step 110 a pattern of adhesive is placed on one section of the fabric. Alternatively, the adhesive could first be placed on the inlay and then the RFID inlay applied to the fabric. Next, the RFID inlay is positioned on the section of the fabric at step 120. Once the RFID inlay has been adhered to the fabric, the fabric is folded over the inlay at step 130 to encase the inlay and create an envelope. The sides of the fabric substrate are sealed at step 140. The sealing can occur through welding, sewing, heat treatment or other methods sufficient to create a closed envelope. Once the tag is sealed, it can then be attached to a garment such as by sewing at step 150.

In addition to the foregoing steps, the RFID inlay can be encoded at step 105. The encoding of the tag can include the date of the manufacture, location of production or other details relating to the garment. The encoding can take place at any time including prior to the positioning of the tag on the fabric substrate or alternatively after the tag has been attached to the garment.

After the consumer purchases the garment, the consumer may remove the integral tag along the separation line 54 (see FIG. 2). As the tag has only been attached to the garment along a single edge, the removal will not interfere with the wearing of the garment as only a small portion of the tag (18 and 20 see FIG. 1) will remain. As the fabric material selected is soft and flexible it will not irritate the skin of the wearer.

It will thus be seen according to the present invention a highly advantageous integrated garment label for use with tracking and security has been has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. An integral garment tag, comprising:
a RFID device, the RFID device having an antenna and an integrated circuit connected to the antenna and first and second layers of a flexible material laminated together to cover the antenna and integrated circuit to form a RFID inlay having first and second surfaces and a first dimension;
a flexible fabric substrate having a second dimension at least one and half times greater than the first dimension, the fabric substrate having first and second surfaces each with two sections each of the first and second sections having first and second portions wherein each of the first and second portions is removable from each of the first and second sections, first and second longitudinally extending side edges and first and second transversely extending end edges; the first surface is provided with indicia;
an adhesive layer applied on one of the first and second surfaces of the RFID inlay;
the RFID inlay is positioned completely on a portion of the second section of the fabric substrate first surface such that the adhesive layer is directly in contact with the fabric substrate to hold the RFID inlay securely to the first surface of the substrate second section and the RFID inlay is positioned between the first and second longitudinally extending side edges and adjacent one of the first and second transversely extending end edges;
the fabric substrate is folded over the RFID inlay such that the first surface of the fabric substrate is in contact with the first and second surfaces of the RFID inlay and the first and second longitudinally extending sides of the fabric substrate are secured together to form an envelope encasing the RFID inlay;
wherein the indicia includes a line for tag removal;
wherein the envelope with the RFID inlay has a head space which does not contain any portion of the RFID inlay;
the RFID device is positioned completely below the tag removal line and the removable first and second portions to enable complete removal from the garment tag; and
wherein at least one of the first and second sections is provided with indicia.

2. An integral garment tag as recited in claim 1, wherein the fabric substrate is constructed from recycled polyester.

3. An integral garment tag as recited in claim 1, wherein the indicia includes care instructions for the garment.

4. An integral garment tag as recited in claim 1, wherein the tag removal line includes a perforated line.

5. An integral garment tag as recited in claim 1, wherein the indicia includes a border extending inwardly of each of the first and second longitudinally extending side edges and each of the first and second transversely extending end edges.

6. An integral garment tag as recited in claim 5, wherein the border is visible on both the first and second surfaces of the fabric substrate.

7. An integral garment tag as recited in claim 1, wherein the RFID inlay operates in one of a frequency range selected from a group including low frequency, high frequency or ultra high frequency.

8. An integral garment tag as recited in claim 1, wherein the head space has a dimension less which is less than a dimension of the RFID inlay.

9. An intermediate construction for use with an integral garment tag, comprising:
an RFID inlay having first and second surfaces;
a flexible fabric substrate having first and second surfaces and first and second sections, each of the first and second sections having first and second portions, each of the first and second portions have a dimension that is smaller than a dimension of each of the first and second sections;

the flexible fabric substrate has a centerline that runs parallel to first and second sides;

an adhesive layer disposed on one of the first and second surfaces of the RFID inlay so as to substantially cover the one of the first and second surfaces and the adhesive is in contact with one of the first and second sections of the flexible fabric substrate and spaced inwardly of the first and second sides and the first and second edges of the substrate;

wherein each of the first and second portions is removable from each of the first and second sections; and the RFID inlay is positioned completely below the removable first and second portions and tag removal line to enable complete removal of the RFID inlay from the garment tag; and wherein at least one of the first and second sections is provided with indicia.

10. An intermediate as recited in claim 9, wherein the indicia is visible on each of the first and second sides of the at least one of the first and second sections.

11. An intermediate as recited in claim 9, wherein the first and second sections are foldable about a mid line to form an envelope encasing the RFID inlay.

12. An intermediate as recited in claim 9, wherein the flexible fabric substrate is made from recycled polyester fabric.

13. An intermediate as recited in claim 12, wherein the recycled polyester fabric is PET.

14. An intermediate as recited in claim 9, wherein the RFID inlay operates in one of a frequency range selected from a group including low frequency, high frequency or ultra high frequency.

15. An intermediate as recited in claim 9, wherein the flexible fabric substrate is provided with a privacy addressing feature.

16. An intermediate as recited in claim 9, including a separation line which is perpendicular to the centerline.

\* \* \* \* \*